(12) United States Patent
Määttä et al.

(10) Patent No.: US 8,839,430 B2
(45) Date of Patent: Sep. 16, 2014

(54) INTRUSION DETECTION IN COMMUNICATION NETWORKS

(75) Inventors: Marko Määttä, Oulu (FI); Tomi Räty, Oulu (FI); Tapio Taipale, Oulu (FI); Jouko Sankala, Oulu (FI)

(73) Assignee: Teknologian Tutkimuskeskus VTT, VTT (FI)

( * ) Notice: Subject to any disclaimer, the term of this patent is extended or adjusted under 35 U.S.C. 154(b) by 0 days.

(21) Appl. No.: 13/517,247

(22) PCT Filed: Nov. 22, 2010

(86) PCT No.: PCT/FI2010/051082
§ 371 (c)(1),
(2), (4) Date: Jun. 20, 2012

(87) PCT Pub. No.: WO2011/077013
PCT Pub. Date: Jun. 30, 2011

(65) Prior Publication Data
US 2012/0278890 A1 Nov. 1, 2012

(30) Foreign Application Priority Data
Dec. 23, 2009 (FI) .................................. 20096394

(51) Int. Cl.
*G06F 11/00* (2006.01)
*G06F 12/14* (2006.01)
*G08B 23/00* (2006.01)
*H04L 29/06* (2006.01)
*H04L 12/26* (2006.01)
*H04L 12/24* (2006.01)

(52) U.S. Cl.
CPC .......... *H04L 43/062* (2013.01); *H04L 63/1416* (2013.01); *H04L 63/1425* (2013.01); *H04L 41/145* (2013.01)

USPC .............................................. 726/23

(58) Field of Classification Search
CPC .................................................... G06F 21/554
USPC .................................................. 726/23
See application file for complete search history.

(56) References Cited

U.S. PATENT DOCUMENTS

| | | | |
|---|---|---|---|
| 7,493,659 B1 | 2/2009 | Wu | |
| 7,610,375 B2 * | 10/2009 | Portolani et al. | 709/224 |
| 8,365,112 B2 * | 1/2013 | Oishi et al. | 716/106 |
| 8,365,283 B1 * | 1/2013 | Satish et al. | 726/23 |
| 2003/0065926 A1 * | 4/2003 | Schultz et al. | 713/188 |
| 2003/0145226 A1 | 7/2003 | Bruton | |
| 2003/0200357 A1 * | 10/2003 | Yanosy | 709/328 |
| 2008/0244694 A1 | 10/2008 | Neystadt | |
| 2008/0262991 A1 | 10/2008 | Kapoor | |

FOREIGN PATENT DOCUMENTS

| | | |
|---|---|---|
| EP | 185221 | 11/2007 |
| EP | 2112803 | 10/2009 |
| EP | 2274064 | 11/2010 |
| KR | 20010029544 | 4/2004 |

OTHER PUBLICATIONS

Tombini et al., "A Serial Combination of Anomaly and Misuse IDSes Applied to HTTP Traffic", Proceeding of the 20th Annual Computer Security Applications Conference (ACSAC '04), IEEE Computer Society, Dec. 2004.
Liu Wen-Tao, "Research on Intrusion Detection Rules Based on XML in Distributed IDS", Machine Learning and Cybernetics 2008, International Conference, vol. 3, pp. 1400-1403, Jul. 12-15, 2008.
Endler, D., "Intrusion Detection Applying Machine Learning to Solaris Audit Data", Computer Security Applications Conference, 1998, Proceeding, 14th Annual Phoenix, AZ, USA, Dec. 7-11, Los Alamitos, CA, USA IEEE Comput. Soc., US sivut 268-279.

* cited by examiner

*Primary Examiner* — Dant Shaifer Harriman
(74) *Attorney, Agent, or Firm* — Mark M. Friedman

(57) ABSTRACT

An intrusion detection arrangement for communication networks comprising a network activity observer configured to monitor network traffic by the related traffic elements, such as data packets, thereof and to establish traffic profiles relative to the monitored traffic elements, such as one profile per each monitored traffic element, a misuse detector configured to determine a first indication of a probability of the profiled traffic representing malicious activity through co-operation with a model repository comprising at least one model characterizing a known intrusion attack, an anomaly detector configured to determine, at least logically in parallel with the misuse detector, a second indication of a probability of the profiled traffic representing anomalous activity through cooperation with a model repository comprising at least one model characterizing legitimate network activity, and a classifier configured to operate on said first and second indications to generate a classification decision on the nature of the profiled traffic, wherein the applied classification space includes at least one class for legitimate traffic and at least one other class for other traffic such as malicious and/or anomalous traffic. A corresponding method is presented.

14 Claims, 3 Drawing Sheets

INTRUSION DETECTION IN COMMUNICATION NETWORKS

FIELD OF THE INVENTION

Generally the invention pertains to communication networks. In particular, however not exclusively, the invention concerns intrusion detection therein.

BACKGROUND

Network security and related information security are nowadays major concerns due to the considerable increase in the number and extent of various communication networks during the past two decades with practically imperative reference to the global Internet, for example. Network intrusions may cause significant damage to corporations, governments, and private users all alike. Unauthorized access to one or more network nodes may result in information breaches, information losses, or just annoyance depending of the original motivation and skills of the intruder.

Therefore, an intrusion detection system (IDS) plays a considerable role in providing network or system security and integrity. An entity called NIDS (Network IDS) may be connected to a network node such as a switch, for example, to seek for malicious network traffic. The NIDS is typically configured to trace suspicious activities, such as denial of service or port scanning attacks, by monitoring network activities. Analysis of the traffic and identification of intrusions is performed and in case an attack is detected, the network administrator may be alerted.

Intrusion detection can be generally executed in two different ways: either using misuse detection approach or by anomaly detection approach.

Anomaly detection is based on recognizing network traffic that differs from the predetermined normal activity. If the incoming traffic pattern deviates from the normal traffic patterns, anomalous network activity is revealed. Accordingly, the anomaly detection approach can in theory detect novel intrusions. However, this particular approach often suffers from high false alarm rate.

By contrast, in misuse detection the signatures, i.e. characteristic features, of known attacks are exploited for detecting an intrusion or an attack. The misuse detection is a relatively straightforward approach for detecting intrusions, but obviously novel intrusions cannot be detected.

SUMMARY OF THE INVENTION

The objective is to alleviate the problems described hereinabove relative to known intrusion detection arrangements and methods, and to provide at least a feasible alternative solution incorporating effective means for detecting and optionally preventing intrusion attempts in communication networks.

The objective is achieved by embodiments of an arrangement and a method in accordance with the present invention for monitoring network activities. The devised solution incorporates utilization of both anomaly and misuse detection in a novel, preferably parallel fashion.

Accordingly, in one aspect of the present invention an intrusion detection arrangement, e.g. one or more electronic devices, for communication networks comprises
 a network activity observer configured to monitor network traffic by the related traffic elements, such as data packets, thereof and to establish traffic profiles relative to the traffic elements, such as one profile per each traffic element and/or one profile per a plurality of traffic elements,
 a misuse detector configured to determine a first indication of a probability of the profiled network traffic representing malicious activity in view of one or more traffic elements,
 an anomaly detector configured to determine, preferably at least logically in parallel with the misuse detector, a second indication of a probability of the profiled network traffic representing anomalous activity in view of said one or more traffic elements, and
 a classifier configured to, based on said first and second indications, to generate a classification decision on the nature of the monitored and profiled traffic, wherein the applied classification space includes at least one class for legitimate traffic and at least one other class for other traffic such as malicious and/or anomalous traffic.

In one embodiment the arrangement further comprises an alerter configured to provide a signal, such as a message, indicative of a predetermined, detected traffic class such as malicious traffic class or anomalous traffic class. The signal, e.g. the message(s), may provide information on the nature of the detected intrusion, how severe the intrusion is, a possible source and destination IP (Internet Protocol) addresses in the case of e.g. (TCP (Transmission Control Protocol)/)IP network(s) and/or used ports concerning the intrusion or other activity. Also the detection time instant may be indicated. Preferably the time interval between the occurrence of the intrusion and the actual alert is not more than few seconds. In other words, the detectors and the classifier shall advantageously perform their tasks within such period.

In one, either supplementary or alternative, embodiment the misuse detector and/or the anomaly detector may be configured to apply a number of models, or model repositories such as databases, each of which potentially including a number of models, for determining the first and second indications, respectively. The traffic profile(s) created by the observer may be analyzed in the light of, such as compared against, one or more models.

For instance, either or both the detectors, and/or other elements of the arrangement such as the classifier, may apply a first model such as an XML model (eXtensible Mark-up Language) configured to model a traffic element such as the aforementioned packet. Yet, either or both the detectors and/or other elements may additionally or alternatively apply a second model such as an MSC (Message Sequence Chart) configured to model a network scenario incorporating a plurality of traffic elements. A plurality of traffic elements such as data packets may indeed be associated with a certain non-intrusive or intrusive overall activity pattern such as a port scan scenario. Accordingly, the legitimate and/or non-legitimate activities may be detected by analyzing the established profiles of traffic elements in isolation and/or as aggregate entities of multiple, typically temporally and orderly subsequent elements relative to the available models.

One or more models for correct, i.e. legitimate, network behavior may be provided. Such model(s) may be applied by the anomaly detector and/or at least one other entity, for instance. One or more models for intrusion, i.e. malicious, behavior may be provided. Such model(s) may be applied by the misuse detector as "fingerprint" of the known intrusion attack(s), for instance.

One or more search algorithms may be used for comparing the current profile of network traffic with the model(s). A search algorithm may be a brute force algorithm in which a match is searched (profile features vs. model features, for example) until the end of the model database or until a sufficient match is found according the applied criteria, for example. Additionally or alternatively, more sophisticated search algorithm may be applied.

In one, either supplementary or alternative, embodiment either or both the detectors and/or the classifier may be, form, or include at least one entity selected from the group consisting of: a Bayesian classifier, a neural network classifier, a linear classifier, a non-linear classifier, a kNN classifier, a backpropagation classifier, and a HMM (Hidden Markov Model) classifier. Alternatively or additionally the classifier may comprise a predetermined decision logic applying fixed or adaptive rules, e.g. heuristic rules, for mapping said first and second indications into a classification decision. The classifier may utilize one or more threshold values for comparison with said first and/or second indication. The classifier may support a plurality of classes in the classification space; for example, three classes for legitimate, malicious, and anomalous network activity, respectively, may be provided.

In one, either supplementary or alternative, embodiment the arrangement may comprise a number of electronic devices such as computers for performing the described actions. A single device such as a server device may substantially host all the functionalities of the arrangement. Alternatively, a plurality of physically separate devices may be at least functionally connected together to implement them. The disclosed elements of the arrangement are essentially functional, whereupon their realization may in practical circumstances overlap, be jointly implemented and/or divided into a greater number of smaller components, if desired.

In another aspect of the present invention, a method for intrusion detection in a communication network comprises
  observing network traffic via monitoring the related traffic elements, such as data packets, and establishing traffic profiles relative to the traffic elements, optionally one profile per each traffic element,
  determining a first indication of a probability of the profiled network traffic representing malicious activity in view of one or more traffic elements,
  determining, at least logically in parallel with the misuse detector, a second indication of a probability of the profiled network traffic representing anomalous activity in view of one or more traffic elements, and
  classifying, on the basis of said first and second indications, the monitored and profiled traffic, wherein the applied classification space includes at least one class for legitimate traffic and at least one other class for other traffic such as malicious and/or anomalous traffic.

In some embodiments all the method items may be executed by a single device. In other embodiments, a single item's execution may be shared and/or the execution of (whole) steps may be allocated between multiple devices.

The previously presented considerations concerning the various embodiments of the arrangement may be flexibly applied to the embodiments of the method mutatis mutandis and vice versa, as being appreciated by a skilled person.

The utility of the present invention follows from a plurality of issues depending on each particular embodiment. Misuse detection and anomaly detection may be unified and performed in a parallel fashion. Thus the strengths of the misuse detection may be used for compensating the weaknesses of the anomaly detection, and vice versa. As a result, the overall number of detectable intrusions may increase. Likewise, the false alarm rate may be kept low and detection rate high, which raises the achieved overall security level.

The expression "a number of" refers herein to any positive integer starting from one (1), e.g. to one, two, or three.

The expression "a plurality of" refers herein to any positive integer starting from two (2), e.g. to two, three, or four.

Different embodiments of the present invention are disclosed in the dependent claims.

BRIEF DESCRIPTION OF THE RELATED DRAWINGS

Next the invention is described in more detail with reference to the appended drawings in which FIG. 1 is a combined block and flow diagram of an embodiment of the proposed arrangement with emphasis on functionality.

DETAILED DESCRIPTION OF THE EMBODIMENTS

Generally the suggested solution incorporates a hybrid intrusion detection system. It combines features from both anomaly-based detection and misuse-based detection. Design objectives included achieving low false alarm and high detection rates, which leads to an elevated security level from the standpoint of network users.

There are three basic approaches to combine anomaly detection and misuse detection. One approach is to apply anomaly detection first, which is followed by misuse detection. Observed network activities are fed to an anomaly detection component. The anomaly detector will detect suspicious behavior from normal behavior, and these items are forwarded to a misuse detection component, which identifies intrusions from normal behavior. Items that match to attack patterns are classified as attacks, items that match false alarm patterns are classified as normal activities, and other items are determined as unknown attacks. When using this approach, the anomaly detection should have a high detection rate; missed intrusions cannot be detected by the misuse detector.

Another approach is to apply misuse detection first. Observed network activities are fed to a misuse detection component, and it detects known attacks. Then items that are not identified as known attacks are fed to an anomaly detector. This component detects possible unknown intrusion attempts. Clearly the anomaly detection component should have a low false alarm rate. If the anomaly detector does not have a low false alarm rate, the overall false alarm rate of the system will be high, which makes the system practically useless.

Third potential solution is to use misuse detection and anomaly detection in a parallel fashion, which is the preferential, although not the sole, approach as described in further detail herein.

Figure 1:
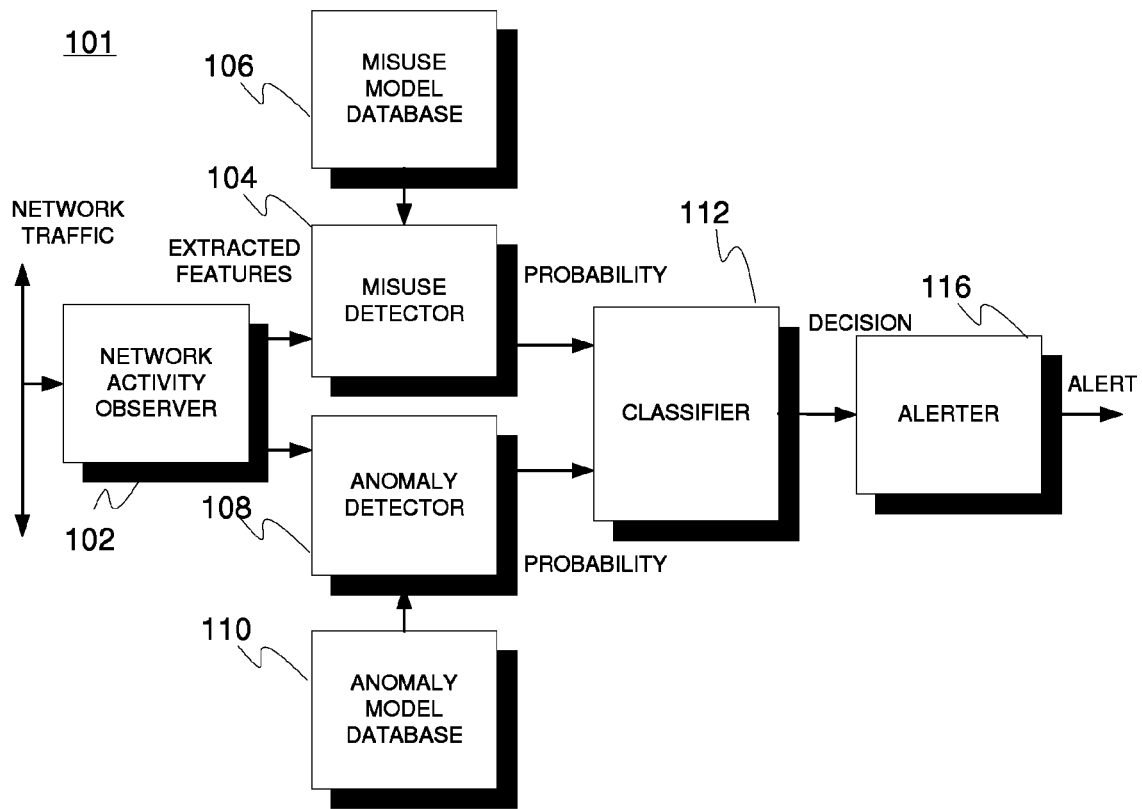

FIG. 1 is a combined block and flow diagram illustrating the overall concept of the present invention according to an embodiment of the related arrangement 101.

In many use scenarios of the arrangement 101 one of the most important performance requirements likely is the detection of possible intrusion attempts occurring in the monitored network. The intrusion attempts may be previously known or unknown. Advantageously the arrangement 101 may alert e.g. the security officer or a predetermined user of the detected intrusion. The alert message may provide information on the type of the intrusion in question, how severe the intrusion is, possible source IP address, destination IP address, used port(s) regarding the intrusion, and/or the time when the intrusion was detected. The arrangement 101 may preferably provide the alert fast enough according to predetermined time limit so that it is not too late to initiate appropriate countermeasures. The arrangement 101 may be self-contained relative to further logic, e.g. IPS (intrusion prevention system), for performing a number of countermeasures against the intrusion such as resetting connections or reprogramming associated firewall (not shown in the figure).

One other common requirement may relate to the capability to provide a modeling approach to characterize intrusions and legitimate network activities. One or more selected features of a single packet may be modeled using the Extensible Markup Language (XML) notation, for instance. However, an intrusion or a legitimate network scenario often requires several packets to be transferred for achieving the intended purpose as deliberated hereinearlier. To solve such a modeling problem e.g. the Message Sequence Chart (MSC) notation may be applied in modeling different network scenarios incorporating a traffic pattern. Monitoring a plurality of traffic elements belonging to a certain scenario instead of single elements may potentially facilitate the detection accuracy due to the increased distinctiveness of the scenario as defined by the number of associated traffic elements from the standpoint of the arrangement 101. The scenario models may be established using the MSC textual format. Graphical format can be utilized in the visualization of the model(s).

Figure 5:
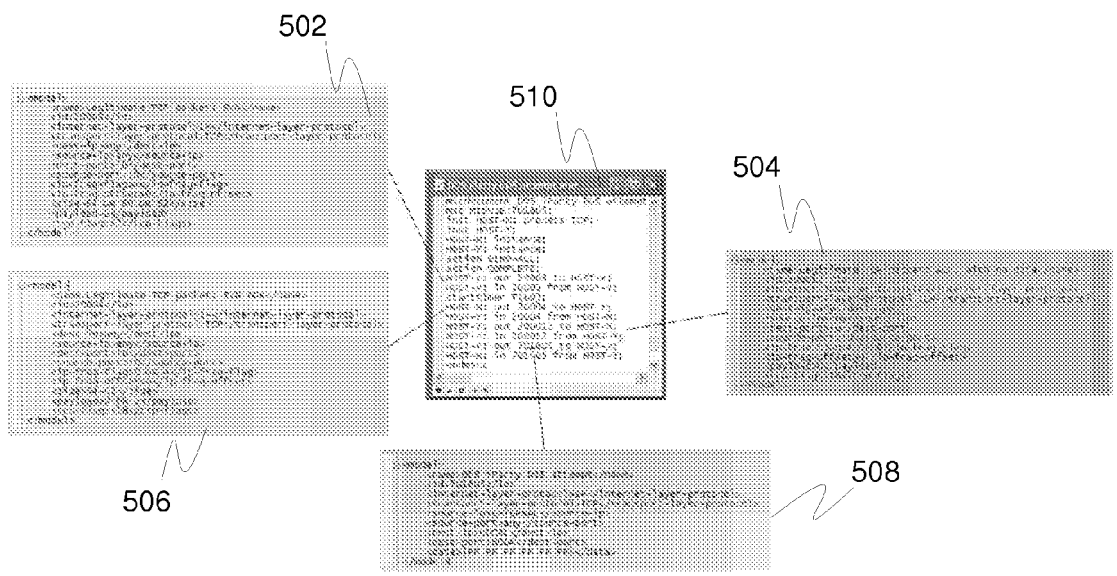
FIG. 5 illustrates few examples of XML and MSC models and their linkage.

The same modeling approach may be generally applied in modeling legitimate network traffic and malicious network traffic as alluded above. Separate models may be created for misuse detection and anomaly detection on a traffic element such as packet level. In FIG. 5, four merely exemplary XML models describing four legitimate packets are shown as boxes 502, 504, 506, 508 on the boundary areas of the figure. And as also mentioned hereinbefore, the scenario level in the network traffic may be modeled using MSC charts. Using the MSC notation a network traffic scenario can be created to describe features that are relevant for intrusion detection on a scenario level. Again, separate models may be created for misuse detection and for anomaly detection. In the center of FIG. 5, an MSC model 510 is depicted. The model may describe a possible intrusion attempt that might be launched in the network. Thus the MSC scenario models may utilize the traffic element, such as packet, models created using the XML notation, and each message in the MSC scenario model may be also modeled using the XML notation on a traffic element level. In the figure this issue is depicted by the links between the messages in the MSC model and the corresponding XML models.

The applied modeling scheme, especially on a scenario level, is advantageously unrestricted to a single protocol or a single intrusion. For example, the scenario modeling can be utilized for building a model that is a collection of different steps (e.g. UDP port scans, TCP port scans, possible exploitation attempt, etc.) required for attacking against networking systems.

Reverting to FIG. 1 and in the light of foregoing, the network activity observer 102 may be made responsible for monitoring the network traffic, meaning e.g. network packets, and creating packet profiles from the monitored packets. The observer 102 may extract a number of predetermined features from the monitored packets and forward the established profiles indicative of the features to the parallel anomaly 108 and misuse 104 detectors. A detector entity including misuse detector 104 and anomaly detector 108 as parallel subcomponents may be made responsible of searching correspondences from the traffic models such as misuse models and legitimate network traffic models.

The anomaly 108 and misuse 104 detectors may be located in separate logical blocks as depicted in the figure.

For instance, the anomaly detector 108 may assign probability as to how anomalous the incoming traffic is. Models for correct network behavior may be stored in the anomaly model database 110. The anomaly model database 110 may comprise a number of traffic models representing legitimate network activities that can be monitored from the network activities in overall. When a correspondence is not found from the legitimate models, an anomalous activity may be deemed as detected.

The misuse detector 104 may assign a probability as to how closely the network traffic resembles intrusion attempts. The known intrusion models may be stored in the misuse model database 106. The misuse model database 106 may thus comprise a number of traffic models representing malicious network activities that the arrangement 101 is configured to detect from the monitored network activities. When a correspondence is found from the misuse models, a malicious activity may be deemed as detected.

Generally, traffic element—based, e.g. packet-based, models and optionally activity pattern—based scenario models, each of the latter relating to a plurality, or stream, of elements, may be applied as described hereinbefore in either or both the model databases 106, 110. Although the model databases 106, 110 may be at least logically seen as separate entities, in practice they may be physically realized as a single repository with different types of elements. A database 106, 110 may comprise a number of models, typically a plurality of models. Multiple databases may be exploited by either or both the detectors 104, 108. Correspondence may be searched from the models for the current monitored network event and a related probability be defined.

The classifier 112, or a logical decision making block, may classify the monitored packet as malicious, anomalous or legitimate, for instance, according to probabilities calculated by the detector entity (by the anomaly 108 and the misuse 104 detectors). For example, the classifier 112 may check whether and/or how the probabilities calculated by the anomaly and misuse detectors 108, 104 deviate from the set threshold values (exceed/remain below) and classify the packet/activity pattern accordingly. If a packet is considered as malicious or anomalous, the alerter 116 will preferably raise an alert. The classifier 112 may be considered to fuse information, i.e. detector probabilities, into a single decision. The information may be fused on traffic element, e.g. packet, level and/or scenario, or stream, level with reference to a plurality of traffic elements defining an activity scenario. The information fusion may be directly based on detection results such that an actual alert is raised afterwards.

Indeed, an alert may indeed be raised by the alerter 116 to inform predetermined one or more target parties, such as the aforesaid security officer and/or network operator, about suspicious network activity. Additionally or alternatively, further notices may be transmitted e.g. in the form of timed reports even if no suspicious activity has been detected since the previous alert or report. An alert may be raised if a predetermined alerting level is met or exceeded in the light of the decision, for instance. The alert may be shown and/or otherwise indicated, optionally audibly, to the user and optionally also logged into a separate file for further analysis. It is possible to reduce the amount of alerts raised and/or indicated by defining an alert level whereupon only alerts indicative of severe intrusions are raised and/or indicated.

Figure 2:
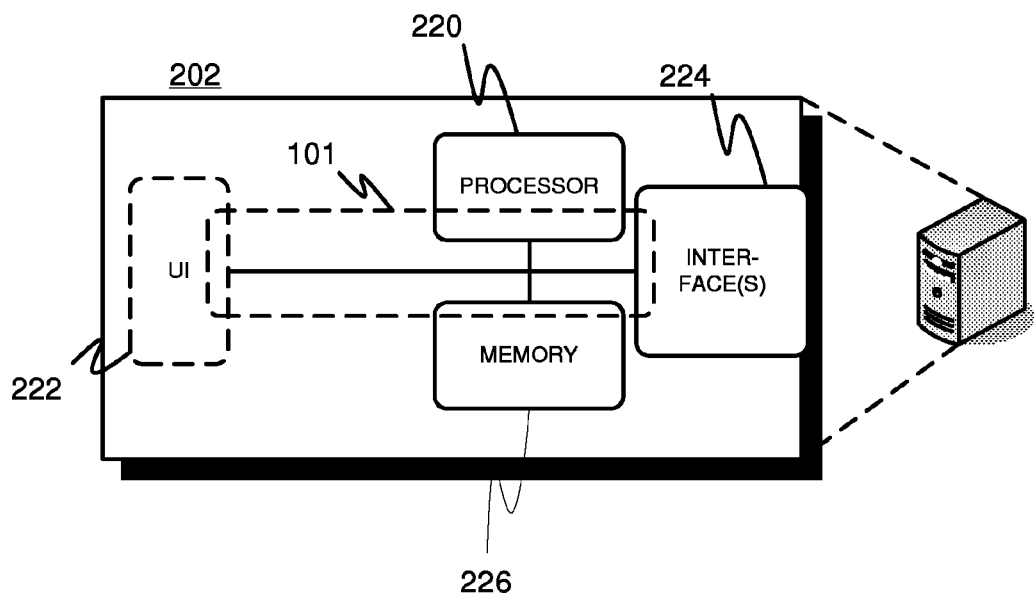
FIG. 2 is a block diagram of an embodiment of the internals of the arrangement with further emphasis on applicable hardware.

FIG. 2 illustrates the internals 202 of an embodiment of the arrangement 101 in accordance with the present invention. The entity in question formed by e.g. one or more electronic devices establishing or hosting the arrangement 101, is typically provided with one or more processing devices capable of processing instructions and other data, such as one or more microprocessors, microcontrollers, DSPs (digital signal processor), programmable logic chips, etc. The processing entity 220 may thus, as a functional entity, physically comprise a plurality of mutually co-operating processors and/or a number of sub-processors connected to a central processing unit, for instance. The processing entity 220 may be configured to execute the code stored in a memory 226, which may refer to e.g. intrusion detection or other software 228 in accordance with the present invention. Software 228 may utilize a dedicated or a shared processor for executing the tasks thereof Similarly, the memory entity 226 may be divided between one or more physical memory chips or other memory elements. The memory 226 may further refer to and include other storage media such as a preferably detachable memory card, a floppy disc, a CD-ROM, or a fixed storage medium such as a hard drive. The memory 226 may be non-volatile, e.g. ROM (Read Only Memory), and/or volatile, e.g. RAM (Random Access Memory), by nature.

The optional UI (user interface) 222 may comprise a display, e.g. an (O)LED (Organic LED) display, and/or a connector to an external display or a data projector, and a keyboard/keypad or other applicable control input means (e.g. touch screen or voice control input, or separate keys/buttons/knobs/switches) configured to provide the user of the entity with practicable data visualization, e.g. alerting, and/or device control means. The UI 222 may include one or more loudspeakers and associated circuitry such as D/A (digital-to-analogue) converter(s) for sound output, e.g. alert sound output, and a microphone with A/D converter for sound input. In addition, the entity comprises an interface 224 such as at least one transceiver incorporating e.g. a radio part including a wireless transceiver, such as WLAN (Wireless Local Area Network), Bluetooth or GSM/UMTS transceiver, for general communications with external devices and/or a network infrastructure, and/or other wireless or wired data connectivity means such as one or more wired interfaces (e.g. LAN such as Ethernet, Firewire, or USB (Universal Serial Bus)) for communication with network(s) such as the Internet and associated device(s), and/or other devices such as terminal devices, control devices, or peripheral devices. It is clear to a skilled person that the disclosed entity may comprise few or numerous additional functional and/or structural elements for providing beneficial communication, processing or other features, whereupon this disclosure is not to be construed as limiting the presence of the additional elements in any manner.

Figure 3:
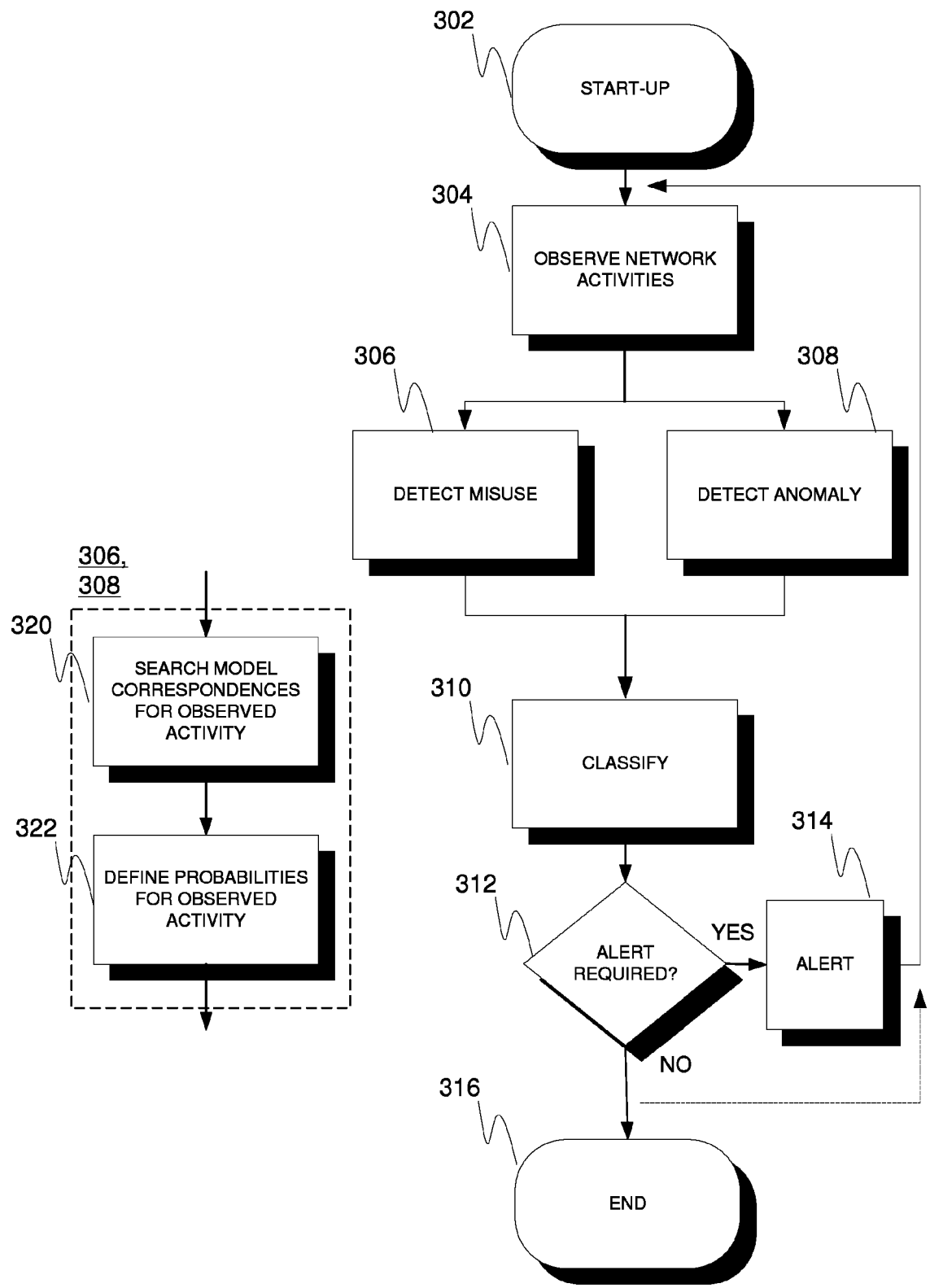
FIG. 3 is a flow chart disclosing an embodiment of a method in accordance with the present invention.

FIG. 3 discloses, by way of example only, a method flow diagram in accordance with an embodiment of the present invention. At 302 the arrangement for executing the method is obtained and configured, for example, via installation and execution of related software and hardware. E.g. MSC and/or XML models may be generated and/or loaded for subsequent intrusion detection.

At 304 the network activity observer monitors network traffic and creates profiles based on a number of traffic elements such as packets propagating in the network. The observer may be configured to observe only certain type(s) of traffic such as IP, TCP, and/or UDP (User Datagram Protocol) traffic. This feature can be very useful in situations where only desired kinds of intrusions are under surveillance.

At 306 and 308 the misuse and anomaly detectors are executed, respectively. Possible internal phases of either detector are illustrated in the separate partial flow diagram of two items 320, 322 on the left half of the figure. The detectors are searching correspondences to the profile(s) from the malicious (known attacks) and legitimate network activity models at 320. A profile created by the observer may be compared against one or more models, each describing the content of a (known) packet, for instance. E.g. XML models may be provided for malicious network packets and legitimate network packets such that the correspondences are searched from these both model groups. The same profile may be fed to misuse detector and anomaly detector. The misuse detection and anomaly detection may be executed in parallel relative to the input data. Also the profile's relation to available network scenarios (traffic patterns) associated with a plurality of traffic elements such as packets and defined using e.g. MSC models may be determined applying the parallel approach or just a selected detector. Examples of such scenarios include e.g. a legitimate TCP handshake procedure or a malicious TCP port scan attack.

At 322 a misuse probability and anomaly probability are calculated on the basis of matches found from the applied models such as the aforesaid XML and MSC models. The misuse probability may describe how malicious the observed network activity is, for example. This probability may be defined separately for a single malicious packet and for a malicious scenario associated with the packet. The anomaly probability may correspondingly describe how anomalous the observed activity might be. This may be also defined for a single packet and a scenario. The probability may be indicated as a numerical value between 0 and 1, where 0 may refer to unlikely anomalous or malicious activity and 1 to potentially highly malicious or anomalous activity, for instance. The probability values for packet level detection may be utilized to determine the closest match found from the traffic models. In other words, a complete match may not be necessary for successful detection. On a scenario level, the probability values may predict and be used to estimate the future development of a scenario based on the information provided by the current and past activities.

At 310 the observed network activity may be classified e.g. into legitimate, malicious, or anomalous class. The classification is preferably executed utilizing the probabilities defined in the previous item. In the case of a non-legitimate and/or some other predetermined type of a traffic element or scenario, e.g. anomalous packet, an alert may be raised to inform a predetermined entity such as the network operator about the possible intrusion. This is checked at 312 based on e.g. existing alert settings and subsequently the alert is executed at 314, if necessary.

The arrangement may provide e.g. a console-based user interface for activating and ceasing the monitoring, closing the related application(s), and/or changing the alerting settings. The possible alerts may be also printed on the console. This way the user of the arrangement may conveniently become aware of a possible intrusion attempt as soon as possible.

As another optional feature (not shown in the figure), predetermined information may be written into one or more logs (e.g. log files). Certain potentially advantageous information to be logged is the actual intrusion detection and/or associated alert. The alert may be shown on a screen but it can be also stored in a log file. This way data about the detections may be made available for later analysis. The information stored in the log may describe at least one element selected from the group consisting of: characteristics of the encountered intrusion, information concerning the sender and/or the receiver, and the used protocol. Further, relations to the XML and MSC models may be described in the log. The log may include a text file, for example. When an intrusion is detected, the profile that caused the intrusion alert may also be at least partially stored in a log file for analysis. The information in the log file may include at least one element selected from the group consisting of: timestamp, an ID number of the profile, protocol, size of the complete packet, and the size of the payload. Complete packet(s) may be stored in the profile log file as ASCII dump, for instance. A further logging feature may be the error and exception logging. When an error or exception is encountered, the related information may be logged in the error log file.

Method execution is ended at 316. The broken arrow on the right depicts the potentially substantially continuous nature of method execution. The mutual ordering and overall presence of the method items, as already deliberated above, may be altered by a skilled person based on the requirements set by each particular use scenario.

Figure 4:
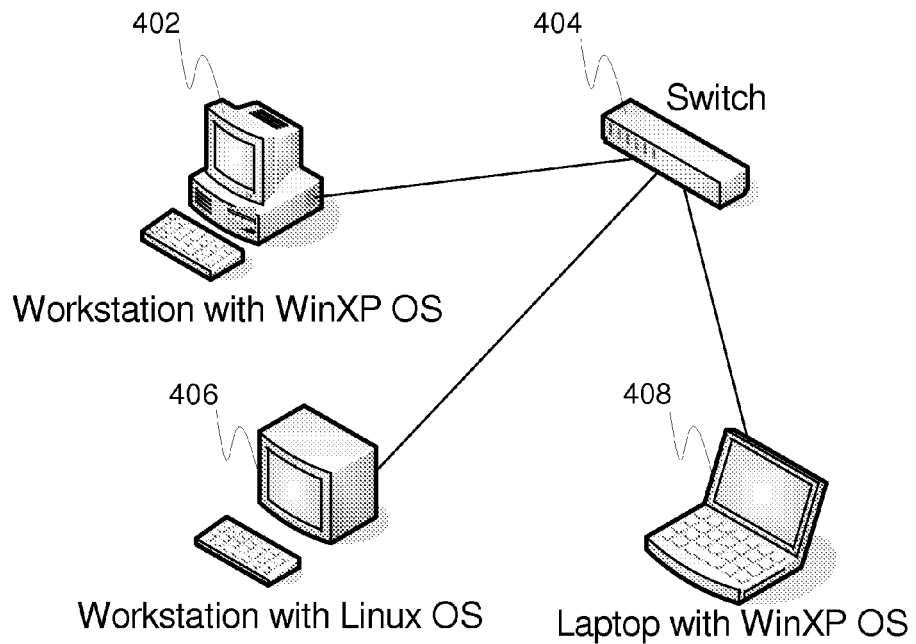
FIG. 4 illustrates an embodiment of a test environment's layout.

With reference to FIG. 4, a simplified illustration of an embodiment of a tried test network environment is presented. For instance, a switch 404 connecting a plurality of computers together, a workstation 402 with e.g. Windows XP operating system including an embodiment of the arrangement/method, a laptop 408 with Windows XP operating system and a tool that is configured to generate legitimate network traffic and simulate intrusions, and a workstation 406 with Linux operating system deploying a network monitoring tool, may be provided in the test set-up.

Firstly, an embodiment of the arrangement in accordance with the present invention was used for monitoring the test network where all the generated traffic was legitimate. As a positive remark, the arrangement did not substantially produce alarms for this purely legitimate test traffic. Next, traffic incorporating also malicious activities was tested. The basic assumption was that it may be a challenging task to combine the misuse and anomaly detection; a profile created from the observed network activity is to be compared against models describing malicious activities and legitimate activities, which may be exhausting and require a lot of resources. The results from the misuse and the anomaly detection results are to be then evaluated using a logical decision making procedure for effectively classifying the observed activity as legitimate, malicious, or anomalous, for instance. This requires well designed logical decision making (classification). The experimental test results positively indicated that correctly modeled intrusions are well detected and the false alarm rate is still relatively low. The highest false alarm rate was less than about 5% and even detection rates up to 100% were achieved depending on the test run data and used settings of the arrangement. The modeling approach using e.g. the XML and the MSC may therefore provide a preferred way to describe malicious and legitimate network activities. The parallel approach for unifying the misuse detection and the anomaly detection thus provides a generally efficient method for intrusion detection.

Consequently, a skilled person may on the basis of this disclosure and general knowledge apply the provided teachings in order to implement the scope of the present invention as defined by the appended claims in each particular use case with necessary modifications, deletions, and additions, if any. For example, different alternative or supplementary models may be applied in connection with an embodiment of an arrangement or method of the present invention. Among other options, an HMM, or a modified HMM, may be adapted for intrusion detection. The HMM is relatively effective for intrusion detection, although the associated training phase for modeling correct network behavior may be computationally expensive. Also random forests may be an acceptable choice for misuse and anomaly detection. Further, neural networks may be adopted. For instance, a Distributed Neural Network Learning algorithm (DNNL) may be applied. Yet, a genetic algorithm (GA)-based approach is still one more solution for intrusion (misuse) detection. The GA-based intrusion detection may contain e.g. a training module for generating of classification rules set from network traffic data and an intrusion detection module for classifying network connections in the real-time environment.

The invention claimed is:

1. An intrusion detection arrangement for communication networks comprising
a network activity observer configured to monitor network traffic by the related traffic elements, optionally data packets, thereof and to establish traffic profiles relative to the monitored traffic elements, such as one profile per each monitored traffic element,
a misuse detector configured to determine a first numerical indication of a probability, between 0 and 1, of the profiled traffic representing malicious activity through cooperation with a model repository comprising at least one model characterizing a known intrusion attack,
an anomaly detector configured to determine, at least logically in parallel with the misuse detector, a second numerical indication of a probability, between 0 and 1, of the profiled traffic representing anomalous activity through co-operation with a model repository comprising at least one model characterizing legitimate network activity, and
a classifier configured to operate on said first and second numerical indications to generate a joint classification decision on the nature of the profiled traffic, wherein the applied classification space includes at least one class for legitimate traffic and at least one other class for other traffic such as malicious and/or anomalous traffic.

2. The arrangement of claim 1, further comprising an alerter configured to provide an alert signal in response to a detected traffic of predetermined type, such as malicious and/or anomalous traffic.

3. The arrangement of claim 1, wherein said misuse detector and/or anomaly detector is configured to cooperate with a first model associated with a traffic element, and with a second model associated with a plurality of traffic elements relating to a network activity pattern such as a predetermined intrusion scenario.

4. The arrangement of claim 1, wherein said misuse detector and/or anomaly detector is configured to co-operate with a first model associated with a traffic element, and with a second model associated with a plurality of traffic elements relating to a network activity pattern such as a predetermined intrusion scenario, and wherein the first model applies XML (eXtensible Mark-up Language).

5. The arrangement of claim 1, wherein said misuse detector and/or anomaly detector is configured to co-operate with a first model associated with a traffic element, and with a second model associated with a plurality of traffic elements relating to a network activity pattern such as a predetermined intrusion scenario, and wherein the second model applies MSC (Message Sequence Chart).

6. The arrangement of claim 1, wherein the misuse detector is configured to compare the profiled traffic with modeled malicious network activity in order to determine the first numerical indication.

7. The arrangement of claim 1, wherein the anomaly detector is configured to compare the profiled traffic with modeled legitimate network traffic in order to determine the second numerical indication.

8. The arrangement of claim 1, wherein the classifier comprises decision logic configured to map, optionally through utilization of one or more threshold values, said first and second indications into said classification decision.

9. The arrangement of claim 1, wherein the misuse detector is configured to determine the first numerical indication in the light of traffic element level, such as a data packet level, probability describing how malicious a monitored traffic element is and/or of network activity pattern level probability describing how malicious a monitored scenario relative to a plurality of traffic elements is.

10. The arrangement of claim 1, wherein the anomaly detector is configured to determine the second numerical indication in the light of traffic element level, such as data packet level, probability describing how legitimate a monitored traffic element is and/or of network activity pattern level probability describing how legitimate a monitored scenario relative to a plurality of traffic elements is.

11. The arrangement of claim 1, wherein said network activity observer is configured to monitor all said network traffic.

12. A method for intrusion detection relative to a communication network comprising
- observing network traffic via monitoring the related traffic elements, optionally data packets, and establishing traffic profiles relative to the traffic elements, optionally one profile per each traffic element,
- determining a first numerical indication, between 0 and 1, of a probability of the profiled network traffic representing malicious activity in view of one or more traffic elements through utilization of a number of models characterizing a number of known intrusion attacks,
- determining, at least logically in parallel with the misuse detector, a second numerical indication, between 0 and 1, of a probability of the profiled network traffic representing anomalous activity in view of one or more traffic elements through utilization of a number of models characterizing legitimate network activity, and
- classifying, jointly on the basis of said first and second numerical indications, the monitored and profiled traffic, wherein the applied classification space includes at least one class for legitimate traffic and at least one other class for other traffic such as malicious and/or anomalous traffic.

13. The method of claim 12, further comprising generating an alert responsive to the classification decision.

14. A computer program product in a non-transitory computer readable storage medium for intrusion detection relative to a communication network, comprising program code for observing network traffic via monitoring the related traffic elements and establishing traffic profiles relative to the traffic elements, optionally one profile per each traffic element, determining a first numerical indication, between 0 and 1, of a probability of the profiled network traffic representing malicious activity in view of one or more traffic elements through utilization of a number of models characterizing a number of known intrusion attacks determining at least logically in parallel with the misuse detector a second numerical indication, between 0 and 1, of a probability of the profiled network traffic representing anomalous activity in view of one or more traffic elements through utilization of a number of models characterizing legitimate network activity, and classifying, jointly on the basis of said first and second numerical indications, the monitored and profiled traffic, wherein the applied classification space includes at least one class for legitimate traffic and at least one other class for other traffic such as malicious and/or anomalous traffic.

* * * * *